3,443,011
O-ALKYL S-(SUBSTITUTED BENZYL) BENZENE THIOPHOSPHONATES FOR CONTROLLING FUNGI
Noboru Shindo, Yasukazu Ura, and Miyako Mori, Tokyo, and Mitsuru Hayakawa, Omiya, and Kunihiro Ueda, Tokyo, Japan, assignors to Nissan Kagaku Kogyo Kabushiki Kaisha, Tokyo, Japan, a corporation of Japan
No Drawing. Filed Mar. 27, 1967, Ser. No. 625,974
Claims priority, application Japan, Mar. 31, 1966, 41/19,570; Oct. 1, 1966, 41/64,379
Int. Cl. A01n 9/36; A61k 27/00
U.S. Cl. 424—222                                  7 Claims

ABSTRACT OF THE DISCLOSURE

The present invention relates to the process of using an organic phosphorous fungicidal composition characterized by containing as its active ingredient an organic phosphorous compound express by the following general formula:

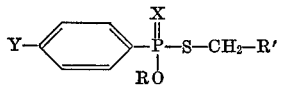

where:
R—low alkyl radical,
R'—phenyl radical or phenyl radical substituted by low alkyl radical,
X—oxygen or sulfur atom, and
Y—chlorine or methyl radical or hydrogen atom, but when Y represents hydrogen atom, R' will be a phenyl radical substituted by a low alkyl radical;

as a fungicide and to prevent rice blast.

---

The present invention relates to an organic phosphorous fungicidal composition characterized by containing as its active ingredient at least one of the organic phosphorous compounds expressed by the following general formula:

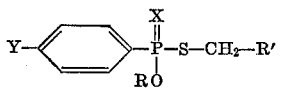

where:
R—low alkyl radical,
R'—phenyl radical or phenyl radical substituted by low alkyl radical,
X—oxygen or sulfur atom, and
Y—chlorine or methyl radical or hydrogen atom; but when Y is hydrogen atom, R' will be a phenyl radical substituted by a low alkyl radical;

and to the process for producing said organic phosphorous fungicidal composition.

Traditionally, organomercury compounds have been used to control the rice blast, but on account of their residual toxicity, a search has been made for other effective control agents. For this purpose, the present inventors investigated the fungicidal property of different organic phosphorous compounds and as the result have discovered that the organic phosphorous compounds as expressed by the above-mentioned general formula are remarkably effective to control the rice blast and these compounds can be produced with high yield by exploiting the following reaction:

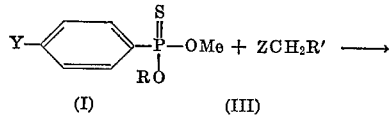

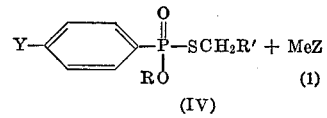

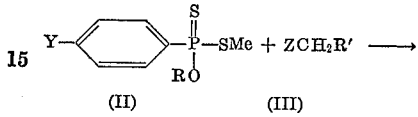

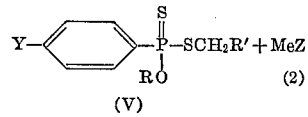

where R, R', X and Y are the same as above; Me is alkali metal; and Z is halogen atom.

The compound expressed by (I) in the Formula 1 can be obtained with high yield by reacting, for instance, the substituted benzenethionophosphonic acid dichloride with 3 times mols of caustic alkali in a great excess of lower alcohol, while the compound as expressed by (II) of the Formula 2 can be obtained with high yield through reaction between the substituted benzenethionophosphine-sulfide and lower alcohol, as, for example, is publicly known from the Journal of Organic Chemistry vol. 27, p. 3832 (1962). If these compounds are reacted with the compound as expressed by (III), for instance, benzylchloride, paramethylbenzylchloride, paraethylbenzylchloride, etc., the compounds as expressed by (IV) or (V), that is, O-alkyl-S-substituted benzyl substituted benzenethiophosphonate or dithiophosphonate will be obtained easily and with high yield.

Generally speaking, it would be desirable to carry out the reactions of the Formulas 1 and 2 in the presence of water or the solvent such as alcohol or acetone.

The following are some examples of compounds as active ingredient of this invention.

O-methyl S-(para methyl benzyl) benzene thiophosphonate
O-methyl S-(para methyl benzyl) benzene dithiophosphonate
O-methyl S-(para ethyl benzyl) benzene thiophosphonate
O-methyl S-(para ethyl benzyl) benzene dithiophosphonate
O-methyl S-(para propyl benzyl) benzene thiophosphonate
O-ethyl S-(para methyl benzyl) benzene thiophosphonate
O-ethyl S-(para methyl benzyl) benzene dithiophosphonate
O-ethyl S-(para ethyl benzyl) benzene thiophosphonate
O-ethyl S-(para ethyl benzyl) benzene dithiophosphonate
O-ethyl S-(para propyl benzyl) benzene thiophosphonate
O-ethyl S-(para propyl benzyl) benzene dithiophosphonate
O-methyl S-(benzyl) chloro benzene thiophosphonate
O-methyl S-(benzyl) chloro benzene dithiophosphonate
O-ethyl S-(benzyl) chloro benzene thiophosphonate
O-ethyl S-(benzyl) chloro benzene dithiophosphonate
O-methyl S-(benzyl) toluen thiophosphonate
O-ethyl S-(benzyl) toluen thiophosphonate
O-ethyl S-(benzyl) toluen dithiophosphonate When the active ingredient of this invention which is an organic phosphorous compound is to be used for controlling the rice blast, it goes without saying that said compound can be prepared by the routine method as emulsifiable concentrate, wettable-powder, dust or granule; and also said compound may be applied as mixed with other fungicides, insecticides, foliage sprays or fertilizers. The solid carriers applicable for this invention include talc, clay, kieselguhr, vermiculite; and the liquid carriers applicable comprise toluene, xylene, etc.

The following are some typical examples of applying the active ingredient of this invention experimentally.

TEST 1.—FUNGICIDAL TEST

A rice plant (Aichiasahi, 4~5 leaves stage) cultivated in a 15 cm. pot was sprinkled with an emulsion of the test compound, i.e., a water-diluted solution of the emulsion obtained by uniformly dissolving and mixing 20 parts of test compound, 65 parts of xylene and 15 parts of emulsifying agent; and after 24 hours, it was spray-inoculated with a spore suspension of Piricularia oryzae (containing about 15 spores in one field under Olympus microscope, 150×). The whole thing was held at 20~25° C. and high humidity (in dew condition) for 48 hours. Then, it was left in the green house for 7 days, after which the average disease rate per leaf was counted with upper two leaves of a stalk for 20 stalks per pot, 2 pots per one test lot; and thus the protective value was calculated as follows:

Average disease rate per leaf =

$$\frac{0 X n_0 + 1 X n_1 + 2 X n_2 + 3 X n_3 + 4 X n_4}{n_0 + n_1 + n_2 + n_3 + n_4}$$

where 0, 1 . . . 4 represent respectively the diseased degree of a leaf, in five classes of 0 (healthy)~4 (affected area over 80%); $n_0, n_1 \ldots n_4$ represent respectively the diseased degree of a whole plant in terms of the number of leaves attacked and correspond to 0, 1 . . . 4.

Protective value =

$$\left(1 - \frac{\text{disease rate per leaf in test lot}}{\text{disease rate per leaf in control}}\right) \times 100$$

TEST RESULTS 1

[Test compound concentration, 1,000 p.p.m.]

| Test compounds | Average disease rate per leaf | Protective value | Damage |
|---|---|---|---|
| O-ethyl-S-(benzyl) chloro benzene thiophosphonate. | 0.03 | 98 | No. |
| O-ethyl-S-(benzyl) toluen thiophosphonate. | 0.02 | 99 | No. |
| O-ethyl-S-(para ethyl benzyl) benzene thiophosphonate. | 0.03 | 98 | No. |
| O-ethyl-S-(para propyl benzyl) benzene thiophosphonate. | 0.68 | 55 | No. |
| O-ethyl-S-(para ethyl benzyl) benzene dithiophosphonate. | 0.40 | 73 | No. |
| O-ethyl-S-(para methyl benzyl) benzene thiophosphonate. | 0.33 | 78 | No. |
| O-ethyl-S-(para propyl benzyl) benzene dithiophosphonate. | 0.70 | 53 | No. |
| Commercial anti-rice blast agent (O,-O-diethyl S-benzyl-phosphonothiolate). | 0.27 | 82 | No. |
| Control (non-active substance) | 1.50 | 0 | No. |

TEST RESULTS 2

[Test compound concentration, 500 p.p.m.]

| Test compounds | Average disease rate per leaf | Protective value | Damage |
|---|---|---|---|
| O-methyl S-(para methyl benzyl) benzene thiophosphonate. | 0.38 | 78 | No. |
| O-ethyl S-(para methyl benzyl) benzene thiophosphonate. | 0.65 | 62 | No. |
| O-methyl S-(para propyl benzyl) benzene thiophosphonate. | 0.79 | 54 | No. |
| O-methyl S-(para methyl benzyl) benzene dithiophosphonate. | 0.74 | 57 | No. |
| Commercial anti-rice blast agent (O,O-diethyl S-benzyl phosphonothiolate). | 1.00 | 42 | No. |
| Control (non-active substance) | 1.72 | 0 | No. |

TEST RESULTS 3 [1]

| Test compounds | Compound concentration (p.pm.) | Average disease rate per leaf | Protective value | Damage |
|---|---|---|---|---|
| O-ethyl S-(benzyl) chloro benzene thiophosphonate. | 250 | 0.48 | 79 | No. |
| | 125 | 1.38 | 40 | No. |
| O-ethyl S-(benzyl) toluene thiophosphonate. | 250 | 0.33 | 86 | No. |
| | 125 | 1.14 | 51 | No. |
| Commercial anti-rice blast agent (O, O-diethyl S-benzyl phosphonothiolate). | 250 | 1.54 | 33 | No. |
| Control (non-active substance). | | 2.31 | 0 | No. |

[1] In this test, it was inoculated after 48 hours of compound sprinkled.

It is evident from these test results that the compound of this invention is highly effective for controlling the rice blast and yet does no damage to the plant.

In the following are illustrated some examples of embodying this invention, where the parts are in weight.

Example 1

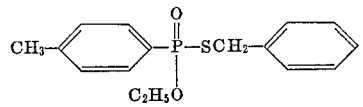

21.6 g. of toluenethionophosphonic acid ethylester was neutralized with 10% caustic soda into sodium toluenethionophosphonic acid ethylester. Then, 12.6 g. of benzylchloride was dropped at 20° C. and made to react at 80° C. for three hours. After the reaction completed itself, the whole thing was subjected to benzene extraction; the benzene solution was washed with water and after drying with anhydrous Glauber's salt and distilling off the benzene, 26.3 g. of O-ethyl S-benzyl toluenethiophosphonate was obtained with a yield of 86% and a purity of 97% (by chromatography).

Example 2

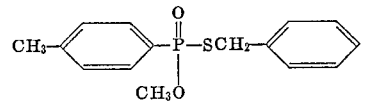

20.2 g. of toluenethionophosphonic acid methylester was neutralized with 10% caustic soda into sodium toluenethionophosphonic acid methylester. Then 12.6 g. of benzylchloride was dropped at 20° C. and made to react at 80° C. for three hours. After the reaction completed itself, the whole thing was subjected to benzene extraction and the benzene solution was washed with water. After drying with anhydrous Glauber's salt and distilling off the benzene, 25.4 g. of O-methyl S-benzyl toluenethiophosphonate was obtained with a yield of 87% and a purity of 96% (by chromomatography).

Example 3

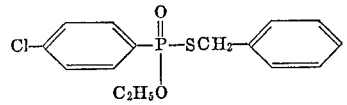

23.7 g. of chlorobenzene thionophosphonic acid ethylester was neutralized with 10% caustic soda into sodium chlorobenzenethionophosphonic acid ethylester. Then 12.6 g. of benzylchloride was dropped at 20° C. and made to react at 80° C. for three hours. After the reaction completed itself, the whole thing was subjected to benzene extraction and the benzene solution was washed with water. After drying with anhydrous Glauber's salt and distilling off the benzene, 28 g. of O-ethyl S-benzyl chlorobenzenethiophosphonate was obtained with a yield of 86% and a purity of 94% (by chromatography).

Example 4

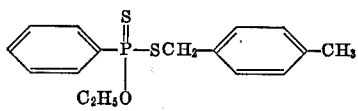

21.8 g. of benzenethiophosphonic acid ethylester was neutralized with 10% caustic soda into sodium benzenedithiophosphonic acid ethylester.

Then 14 g. of paramethylbenzylchloride was dropped at 20° C. and made to react at 80° C. for three hours. After the reaction completed itself, the whole thing was subjected to benzene extraction and the benzene solution was washed with water. After drying with anhydrous Glauber's salt and distilling off the benzene, 27 g. of O-ethyl S-paramethyl benzylbenzenedithiophosphonate was obtained with a yield of 84% and a purity of 94% (by chromatography).

Example 5

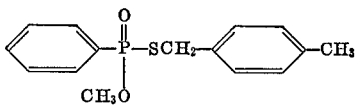

18.8 g. of benzenethionophosphonic acid methylester was neutralized with 10% caustic soda into sodium benzenethionophosphonic acid methylester. Then 14 g. of paramethyl benzylchloride was dropped at 20° C. and made to react at 80° C. for three hours. After the reaction completed itself, the whole thing was subjected to benzene extraction and the benzene solution was washed with water. After drying with anhydrous Glauber's salt and distilling off the benzene, 24.6 g. of O-methyl S-paramethylbenzylbenzenethiophosphonate was obtained with a yield of 85% and a purity of 95% (by chromatography).

Example 6—Wettable powder

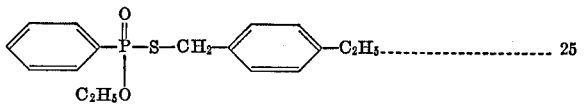 25

"Lunox" 1000C (dispersing agent, trade name) sodium dinaphthylmethane disulfonate ........................................... 10
Clay ........................................................................ 40
Diatom earth .............................................................. 25

The above ingredients were evenly mixed and crushed into a wettable powder; and the obtained powder was diluted with water and sprinkled.

Example 7—Dust

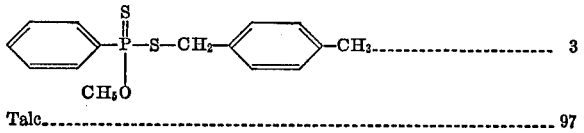 3

Talc ........................................................................ 97

The above ingredients were evenly mixed and crushed into a dust preparation, which was sprinkled as it was.

Exampde 8—Granule

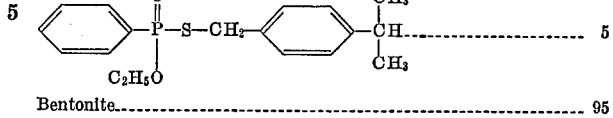 5

Bentonite .................................................................. 95

The above ingredients were evenly mixed and crushed; kneaded with addition of a little water; transformed into granules by an extruder; and dried into a granule preparation, which was sprinkled as it was.

What is claimed is:

1. A method for controlling plant fungi comprising applying to said fungi on a plant surface a fungicidally effective amount of at least one organic phosphorous compound having the formula:

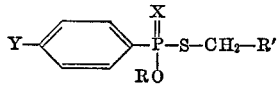

where R is lower alkyl,
R' is selected from the group consisting of phenyl and phenyl substituted by lower alkyl,
X is selected from the group consisting of oxygen and sulfur, and
Y is selected from the group consisting of chlorine, methyl and hydrogen; but when Y represents hydrogen, R' will be phenyl substituted by lower alkyl.

2. The process of claim 1, wherein said plants protected are rice plants and said disease protected against is rice blast.

3. The method of claim 1, wherein said compound is O-ethyl S-(benzyl) chloro benzene thiophosphonate.

4. The method of claim 1, wherein said compound is O-ethyl S-(benzyl) toluene thiophosphonate.

5. The method of claim 1, wherein said compound is O-ethyl S-(para ethyl benzyl) benzene thiophosphonate.

6. The method of claim 1, wherein said compound is O-ethyl S-(para methyl benzyl) benzene thiophosphonate.

7. The method of claim 1, wherein said compound is O-methyl S-(para methyl benzyl) benzene thiophosphonate.

References Cited

UNITED STATES PATENTS

| | | |
|---|---|---|
| 2,862,017 | 11/1958 | Schrader. |
| 2,992,158 | 7/1961 | Berkelhammer. |
| 2,992,265 | 7/1961 | Schrader ............ 260—961 |
| 3,013,047 | 12/1961 | Schrader. |

ALBERT T. MEYERS, *Primary Examiner.*

S. J. FRIEDMAN, *Assistant Examiner.*